United States Patent Office 3,819,807
Patented June 25, 1974

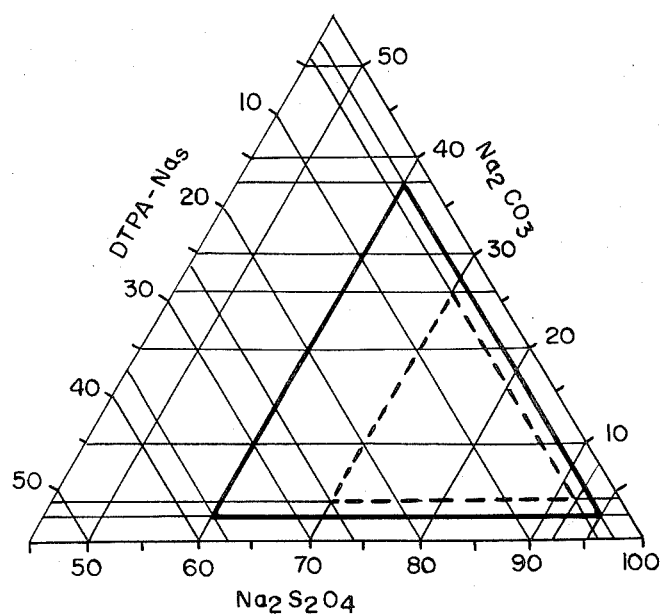

3,819,807
STABILIZED SODIUM DITHIONITE COMPOSITIONS
Siegfried Schreiner and Siegmar Lukas, Ludwigshafen, and Franz Poschmann, Limburgerhof, Germany, assignors to Badische Anilin- & Soda-Fabrik Aktiengesellschaft, Ludwigshafen (Rhine), Germany
Filed Feb. 14, 1972, Ser. No. 226,021
Claims priority, application Germany, Feb. 19, 1971, P 21 07 959.4
Int. Cl. C01b 17/66
U.S. Cl. 423—265    2 Claims

ABSTRACT OF THE DISCLOSURE

Stabilized sodium dithionite compositions which are not spontaneously flammable and contain sodium diethylene triaminopenta-acetate.

---

This invention relates to stabilized sodium dithionite compositions showing no tendency to spontaneous ignition.

Dithionites such as zinc dithionite and sodium dithionite are used in industry in large quantities for bleaching paper containing groundwood.

Due to the fire hazard involved in the use of sodium dithionite, recent years have been the increasing use, commercially, of zinc dithionite as bleaching agent for the above purpose. At the present time, however, a large number of countries have laws restricting the use of zinc dithionite, since zinc ions have a definite toxic effect on aquatic organisms contacted by waste water. As a result, this compound, which is not spontaneously flammable in the presence of water, cannot be used to the same extent as hitherto as a bleaching agent for paper and it is thus necessary to make greater use of sodium dithionite for this purpose. This bleaching agent has also been used for the above purpose for many years, but it tends to undergo spontaneous decomposition up to the point of formation of a smoldering fire, this being particularly so when it is stored in moist rooms in damaged packings or when insufficient care is exercised. It is thus desirable to provide a stable sodium dithionite or sodium dithionite composition. Attempts to achieve this end are numerous, as are the patents which propose a solution to this problem along various lines. Thus for example U.S. Pat. 1,810,663 proposes the addition of oils, fats and waxes, as these compounds form a water-repellent film around the sodium dithionite particles. Rosin is the agent proposed in U.S. Pat. 2,121,397. Finally, U.K. Pat. 695,375 recommends the use of liquid esters. However, these enveloping agents have not been entirely successful in practice, as it is almost impossible to achieve complete envelopment and also because the use thereof is complicated and expensive and the admixture of flammable substances further increases the flammability of the sodium dithionite in an entirely undesirable manner. Neither has the addition of carboxylic acid salts capable of conversion to ketones on heating, as proposed in U.S. Pat. 3,054,658, been generally adopted, for the above reasons.

The admixture of inorganic substances such as phosphates has also been tried but is again unsuccessful for the reason that stabilization can only be achieved at a high degree of dilution, which in turn decreases the bleaching activity of the products. Moreover, some countries have recently introduced legislation limiting the use of phosphates because the presence of phosphate compounds in waste water tends to increase the formation of algae.

It is an object of the invention to provide a stabilized sodium dithionite composition.

It is a further object to provide compositions which, on account of their stability, are not liable to spontaneous oxidation and thus to spontaneous ignition.

It is yet another object of the invention to provide a composition having a bleaching activity which is at least equivalent to that of prior art compositions.

The compositions of the invention are composed as follows:

from 60 to 95% of sodium dithionite
from 2.5 to 37.5% of calcined soda (anhydrous sodium carbonate)
from 2.5 to 37.5% of sodium diethylenetriaminopenta-acetate, the percentages being by weight.

A preferred composition is characterized by a content of from 70 to 92% of sodium dithionite, from 4 to 26% of calcined soda and from 2 to 26% of sodium diethylenetriaminopenta-acetate, all percentages being by weight of the total composition.

The compositions of the invention are illustrated within the triangle drawn in bold lines in the accompanying triangular diagram. The smaller triangle drawn in bold dashes in said diagram illustrates the preferred conditions. The base of the triangle signifies the sodium dithionite content, the left-hand side represents the content of sodium diethylenetriaminopenta-acetate and the right-hand side the content of calcined soda. Commercial sodium dithionite usually contains small amounts of impurities such as sodium chloride, sodium sulfate, sodium sulfite, sodium pyrosulfite, sodium thiosulfate and other salts. These salts may thus be included in the percentages of dithionite given and thus be present in the compositions of the invention in amounts depending on the concentrations in the commercial sodium dithionite.

The additives claimed in German Pats. 1,220,399 and 1,226,992 may also be present, without detriment, in the composition of the invention within the limits specified in said patents. Examples of such materials are sodium polyacrylate and/or urea. According to the above references, these additives are admixed with normal sodium dithionite compositions, as described above, but they do not serve as stabilizers. Such additions are merely made to modify the bleaching effect on the paper treated.

Examples of preferred compositions are those containing 76.2% of sodium dithionite, 9.52% of calcined soda, 9.52% of sodium diethylenetriaminopenta-acetate and 4.76% of sodium polyacrylate or those containing 72.8% of sodium dithionite, 8.77% of calcined soda, 6.14% of sodium diethylenetriaminopenta-acetate and 8.77% of urea, these percentages being by weight. These compositions are suitable for bleaching groundwood.

It is well known that soda, when added alone, has a stabilizing effect, probably due to a buffering action and the formation of a protective gas atmosphere of carbon dioxide, but to achieve satisfactory stabilization it is necessary to add well above 40% by weight of calcined soda. As mentioned above in the case of phosphates, such large additions lead to a pronounced decrease in bleaching powder, as described in detail in, for example, U.S. Pat. 3,054,-658, column 2, lines 3 to 13. Moreover, a high percentage of soda is particularly undesirable when bleaching groundwood as alkaline conditions in the groundwood suspension tend to yellow the groundwood. The ingredient proposed by the invention is sodium diethylenetriaminopenta-acetate which surprisingly effects the desired stabilization. In the present context it is particularly surprising to note that it is not possible to achieve the same degree of stabilization with sodium ethylenediaminotetra-acetate, which has a similar structure, in conjunction with soda, as is plainly shown in the following Examples. The invention is illustrated but not limited by the following Examples, in which parts are by weight unless otherwise stated.

EXAMPLE 1

A metal drum insulated with glass wool mats and lined with a plastic sack and having a capacity of 80 parts by volume was filled with 50 parts of commercial sodium dithionite powder (containing 88% of $Na_2S_2O_4$) and 3 parts by volume of water were poured onto the surface of the powder, which was then covered by a further 50 parts of dithionite powder. Three thermometers were inserted into the powder in order to measure the temperature at the bottom of the container, in the middle and at a level about 8 cm. below the surface of the powder.

The temperature rose gradually and the temperature profile after 5 hours and 45 minutes was 46°, 53° and 48° C. as measured by the three thermometers respectively. After a further 45 minutes gas escaped from the powder and emerged at two points in the surface of the powder blowing powder up into the air to form small volcanoes at said points. At this stage, the thermometers showed temperatures of 235°, 190° and 95° C. respectively. Another thermometer was inserted to a depth of about 35 cm. in one of the volcanoes and indicated 330° C. Thus the temperature in the powder varies considerably depending on the point at which smoldering begins and where the sulfur gases rise. The escaping gas substantially consisted of $SO_2$, sulfur vapor and water vapor but contained no hydrogen. The color of the powder at its surface turned to yellow due to the sulfur deposited. No flames were observed. This decomposition effect lasted one hour, after which the temperatures dropped.

In repetitions of this experiment, the periods up to the commencement of the spontaneous rise in temperature accompanied by gas evolution were from 5 to 15 hours.

EXAMPLE 2

The experiment described in Example 1 was repeated using 100 parts of an intimate mixture of 82 parts of dithionite (containing 88% of $Na_2S_2O_4$) and 18 parts of calcined soda. The soda used was relatively coarse, having the following sieve analysis:

more than 0.30 mm. 47%
from 0.20 to 0.30 mm. 51%
less than 0.20 mm. 2%.

The temperature rose gradually and was 45° at the bottom, 51° in the middle and 46° C. at the top of the powder after 7 hours and 15 minutes. Shortly afterward decomposition gases escaped at the surface of the powder forming small volcanoes. The temperatures had then risen to 215°, 205° and 105° C. respectively, whilst a thermometer inserted to a depth of about 15 cm. in one of the volcanoes indicated a temperature of 320° C.

EXAMPLE 3

The experiment described in Example 1 was repeated using 100 parts of the following powder mixture:

82 parts of dithionite powder (containing 88% of $Na_2S_2O_4$)
14 parts of calcined soda
4 parts of sodium ethylenediaminotetra-acetate.

After the addition of water, the temperature rose gradually but was below 50° C. on all three thermometers after a period of 7 hours and 45 minutes. This was followed by a steeper rise in temperature and after a further hour the temperature in the middle of the container was 182° C. This temperature remained for about 3 hours and 30 minutes, after which gradual cooling took place.

Gas was not observed to emerge as in Examples 1 and 2 but there was a strong smell of $SO_2$. Conceivably, this decomposition effect may be more violent under commercial conditions, where dithionite is stored in silos having capacities of up to 5 tons.

EXAMPLE 4

The experiment described in Example 1 was repeated using 100 parts of the following powder mixture:

82 parts of dithionite powder
14 parts of calcined soda
4 parts of sodium diethylenetriaminopenta-acetate.

In this case, the maximum temperature in the middle of the container was 47° C. and this was not reached until 19 hours following the addition of water, at which stage the lower thermometer indicated 36° C. whilst the temperature at the surface of the powder of 25° C. was only just above the ambient temperature (22° C.). The temperature of 47° C. remained for 4 hours, after which slow cooling took place.

We claim:

1. Compositions stabilized against spontaneous ignition, comprising
   from 60 to 95% of sodium dithionite,
   from 2.5 to 37.5% of anhydrous sodium carbonate, and
   from 2.5 to 37.5% of sodium diethylenetriaminopenta-acetate,
these percentages being by weight of the total composition.

2. Compositions stabilized against spontaneous ignition, comprising
   from 70 to 92% of sodium dithionite,
   from 4 to 26% of anhydrous sodium carbonate, and
   from 4 to 26% of sodium diethylenetriaminopenta-acetate,
these percentages being by weight of the total composition.

References Cited

UNITED STATES PATENTS

| | | | |
|---|---|---|---|
| 2,707,145 | 4/1955 | Sparrow et al. | 423—515 X |
| 869,655 | 10/1907 | Rinkenberger | 423—515 |

EARL C. THOMAS, Primary Examiner

U.S. Cl. X.R.
252—188; 423—515